United States Patent
Berndt et al.

(10) Patent No.: US 9,534,680 B2
(45) Date of Patent: Jan. 3, 2017

(54) DIFFERENTIAL GEAR FOR A MOTOR VEHICLE

(71) Applicant: Daimler AG, Stuttgart (DE)

(72) Inventors: Alexander Berndt, Hinterlintal (DE); Andreas Buenting, Stuttgart (DE); Christian Elsner, Fellbach (DE); Christian Krajewski, Ostfildern Ruit (DE); Hartmut Krauter, Korb (DE); Lena Thome, Kassel (DE)

(73) Assignee: Daimler AG, Stuttgart (DE)

( * ) Notice: Subject to any disclaimer, the term of this patent is extended or adjusted under 35 U.S.C. 154(b) by 103 days.

(21) Appl. No.: 14/382,425

(22) PCT Filed: Jan. 23, 2013

(86) PCT No.: PCT/EP2013/000202
§ 371 (c)(1),
(2) Date: Sep. 2, 2014

(87) PCT Pub. No.: WO2013/131600
PCT Pub. Date: Sep. 12, 2013

(65) Prior Publication Data
US 2015/0099602 A1   Apr. 9, 2015

(30) Foreign Application Priority Data

Mar. 3, 2012   (DE) .......................... 10 2012 004 389

(51) Int. Cl.
*F16H 48/06*   (2006.01)
*F16H 48/40*   (2012.01)
(Continued)

(52) U.S. Cl.
CPC .............. *F16H 48/40* (2013.01); *F16H 48/08* (2013.01); *F16H 48/38* (2013.01); *F16H 2048/382* (2013.01); *F16H 2048/385* (2013.01)

(58) Field of Classification Search
CPC .......... F16H 48/06; F16H 48/40; F16H 48/38; F16H 48/08; F16H 2048/382; F16H 2048/385
See application file for complete search history.

(56) References Cited

U.S. PATENT DOCUMENTS 8,015,899 B2   9/2011   Gianone et al.
8,043,188 B2 *  10/2011   Ziech ...................... F16H 48/08
475/230

(Continued)

FOREIGN PATENT DOCUMENTS

DE           102 38 236 A1    3/2004
DE    10 2008 027 167 A1   12/2009

(Continued)

OTHER PUBLICATIONS

International Search Report (PCT/ISA/210) dated Jul. 10, 2013, with English translation (Ten (10) pages).

(Continued)

*Primary Examiner* — David J Hlavka
(74) *Attorney, Agent, or Firm* — Crowell & Moring LLP

(57) ABSTRACT

A motor vehicle differential gear has at least one housing part as a first gear part, and a crown wheel as a second gear part. The first and second gear parts are connected via respective first connection surfaces running in the axial direction by a press fit, and via respective second connection surfaces running at an angle to the axial direction, forming a welding seam. One of the gear parts is formed from a steel and the other gear part from a cast iron material, as well as such a differential gear in which the second connection surfaces connect directly to the first connection surfaces.

9 Claims, 3 Drawing Sheets

Figure 1:
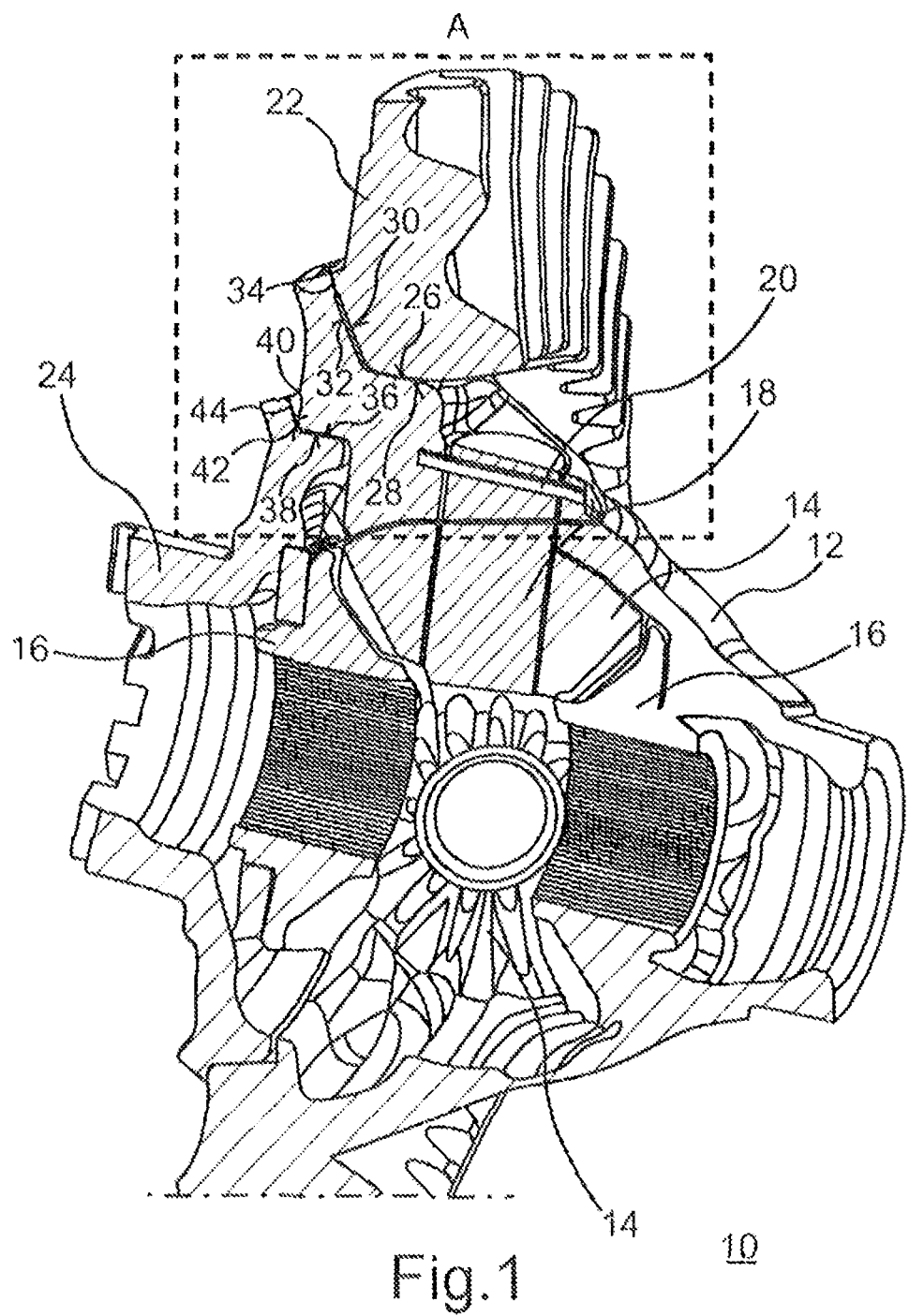

(51) Int. Cl.
*F16H 48/08* (2006.01)
*F16H 48/38* (2012.01)

(56) References Cited

U.S. PATENT DOCUMENTS

| | | | |
|---|---|---|---|
| 8,327,541 B2 * | 12/2012 | Harrup | F16H 48/08 |
| | | | 29/525 |
| 9,157,516 B2 * | 10/2015 | Cripsey | F16H 48/40 |
| 2001/0030224 A1 * | 10/2001 | Eulenstein | B23K 20/16 |
| | | | 228/246 |
| 2006/0063634 A1 | 3/2006 | Szuba | |
| 2009/0205463 A1 | 8/2009 | Gianone et al. | |

FOREIGN PATENT DOCUMENTS

| | | |
|---|---|---|
| EP | 1 953 422 A2 | 8/2008 |
| WO | WO 2010/116235 A1 | 10/2010 |

OTHER PUBLICATIONS

German language Written Opinion (PCT/ISA/237) dated Jul. 10, 2013 (Nine (9) pages).

Chinese Office Action issued in Chinese counterpart application No. 201380012315.1 dated Jan. 29, 2016, with partial English translation (Nine (9) pages).

* cited by examiner

DIFFERENTIAL GEAR FOR A MOTOR VEHICLE

BACKGROUND AND SUMMARY OF THE INVENTION

Exemplary embodiments of the invention relate to a differential gear for a motor vehicle.

U.S. Pat. No. 8,015,899 B2 discloses a differential gear for a motor vehicle, the differential gear comprises a housing part as a first gear part, as well as a crown wheel as a second gear part. The housing part and crown wheel are connected to each other via respective first connection surfaces running in the axial direction, by means of a press fit. Furthermore, the housing part and the crown wheel are connected to each other via respective second connection surfaces running at an angle to the axial direction, forming a welding seem that runs at an angle to the axial direction. This known differential gear has high production costs.

Exemplary embodiments of the present invention provide a differential gear that is more cost-efficient to produce.

To carry out a more cost-efficient production of the differential gear, it is provided in the first aspect of the invention, that one of the gear parts is formed from a steel and the other gear part from a cast iron material. In particular due to the use of the cast iron material, the material or production costs of the differential gear can be kept particularly low.

A further advantage of the differential gear according to the invention is that, due to the angled arrangement of the second connection surfaces, advantageous accessibility for a welding process is created, such that the gear parts can be welded to one other in a time-and cost-efficient manner. Due to the angled arrangement of the second connection surfaces, the welding process can also be moved or led at an angle to the axial direction, whereby collisions with one of the gear parts, in particular with the crown wheel, can be avoided in a simple manner.

A further advantage of the angled arrangement is that the welding seam can be checked by means of uninterrupted testing, in particular by means of ultrasound testing, in a simple and therefore cost-efficient manner. This is, in particular, advantageous compared to welding seams running in the axial direction, which are not able to be checked or only able to be checked at very high expense.

Furthermore, due to the angled arrangement of the second connection surfaces, and thus due to the angled arrangement of the welding seam, an at least fundamentally optimal load distribution can be achieved during the operation of the differential gear. Due to the angled arrangement of the second connection surfaces and thus the welding seam in combination with the press fit, at least fundamentally only pressure loads, in particular, compressive stresses, are transferred via the welding seam. Particularly in comparison to tensile loads, in particular tensile stresses, pressure loads only represent light loads for the welding seam, such that the differential gear also has high robustness and a high certainty of fulfilling its function.

A further aspect that keeps the production costs for the differential gear according to the invention low is that no screw connections are provided to connect the gear parts. The differential gear according to the invention can thus be produced with only a low material requirement, as no screw connections must be provided. Furthermore, this keeps the construction space requirement of the differential gear according to the invention low, whereby packaging problems can be solved and or avoided. The differential gear according to the invention is both applicable for a drive train of a commercial vehicle and of a passenger vehicle.

In an advantageous embodiment, the cast iron material is a grey cast iron. In other words, the other gear part is formed from the grey cast iron. This keeps the production costs of the differential gear according to the invention particularly low. Furthermore, the gear part formed from the grey cast iron has particularly advantageous mechanical properties.

In a particularly advantageous embodiment of the invention, the crown wheel is formed from the steel, in particular case-hardening steel, and the housing part from the cast iron material, in particular grey cast iron. The crown wheel thus has high robustness against high loads, such that particularly high torques can also be transferred onto the crown wheel. The housing part, which is less loaded compared to the crown wheel, is formed from the more cost-efficient cast iron material that has advantageous mechanical properties.

If the second connection surfaces connect directly to the first connection surfaces, then this is advantageous insofar as the crown wheel and the housing part (the gear parts) are produced with only a low material requirement and thus in a particularly cost-efficient manner. Furthermore, the differential gear has only a very low construction space requirement. In other words, in this embodiment, no spacing is provided between the first and second connection surfaces, for example via a respective, at least fundamentally radial wall. Rather, the first connection surfaces pass directly into the second connection surfaces.

For the depiction of a particularly cost-efficient production of the differential gear, it is advantageously provided that the welding seam, via which the gear parts are connected to one another, is formed as the welding seam known from German patent document DE 10 2008 027 167 A1. The gear parts therein are the mechanical components of the arrangement known from German patent document DE 10 2008 027 167 A1 of two mechanical components. During welding of the gear parts, a specific structure in the welding seam is inserted in a targeted manner. The welding of the gear parts can therein occur without the use of additional welding material. This keeps the production costs of the differential gear according to the invention particularly low.

Alternatively, it can be provided that a welding filler material with a proportion of nickel is used during welding of the gear parts. Thus, in particular, a particularly cheap metallurgic connection can be implemented between the gear parts.

The gear parts of the differential gear according to the invention are preferably welded to one another by means of a laser welding method. Thus, the gear parts can be connected to one another in a particularly time and cost-efficient manner, which keeps the production costs of the entire differential gear at a particularly low level.

In the second aspect of the invention, the second connection surfaces are connected directly to the first connection surfaces. In other words, the second connection surfaces, running at an angle, pass directly into the first connection surfaces running in the axial direction, or vice versa. The connection surfaces are thus not at a distance from one another, such that the differential gear can be produced with only a very low material requirement and has only a very low weight as well as a low construction space requirement. Advantageous embodiments of the first aspect of the invention are to be considered as advantageous embodiments of the second aspect of the invention and vice versa.

In a further advantageous embodiment of the invention, at least one further housing part is provided as a third gear part. The further housing part is, therein, connected to the first housing part via respective third connection surfaces running in the axial direction, by means of a press fit, and via respective fourth connection surfaces running at an angle to the axial direction, forming a further welding seam.

As has already been described for the second connection surfaces, the angled arrangement of the fourth connection surfaces have the advantage of particularly simple accessibility for production of the welding seam, such that the gear parts are to be connected to one another in a time and cost-efficient manner. Furthermore, the further welding seam can be checked in a simple manner by means of uninterrupted testing, for example for inclusions or similar malformations.

The combination of the further welding seam with the further press fit has the advantage that only pressure loads are transferred via the further welding seam, such that the differential gear has a high certainty of fulfilling its function and a long life span.

The differential gear according to the invention also enables the advantageous and cost-efficient representation of a modular system. Such a modular system comprises a plurality of crown wheels that are differentiated from one another as first gear parts, a plurality of first housing parts that are differentiated from one another as second gear parts and, if necessary, a plurality of further housing parts that are differentiated from one another as third gear parts. Due to the corresponding, advantageous connections of the gear parts to one another via the press fits and the welding seams, a respective differential can be produced from the respective gear parts in a time and cost-efficient manner. Thus, the modular system enables a production of various differentials according to need, which are adapted to respective use purposes, for example to use in a road vehicle, in a construction vehicle or similar.

In a further advantageous embodiment, the further housing part is formed from steel. Thus, it can withstand high operation demands.

For the implementation of only a low construction space requirement, the fourth connection surfaces are connected directly to the third connection surfaces. The further housing part and the first housing part can thus also be produced with only a very low material requirement and thus cost-efficiently.

In a further advantageous embodiment, the fourth connection surfaces enclose an angle with the axial direction in a range of 25° to 65° inclusive. Advantageously, the fourth connection surfaces enclose an angle with the axial direction of at least fundamentally 60°. Thus, a particularly advantageous accessibility to the fourth connection surfaces is created, such that the first housing part and the further housing part can be connected to each other in a time and cost-efficient manner.

In a further embodiment of the invention, the second connection surfaces enclose an angle with the axial direction in a range of 25° to 65° inclusive. Preferably, the angle between the second connection surfaces and the axial direction amounts to at least fundamentally 60°. Thus, as a consequence thereof, there is very good accessibility to the second connection surfaces, such that the crown wheel can be connected to the first housing part in a time and cost-efficient manner.

Further advantages, features and details of the invention result from the description below of preferred exemplary embodiments, as well as by means of the drawing. The features and combinations of features named above in the description as well as the features and combinations of features named in the description of figures and/or shown solely in the figures are not only applicable in the respective specified combinations, but also in other combinations or stand-alone, without leaving the scope of the invention.

BRIEF DESCRIPTION OF THE DRAWING FIGURES

Figure 2:
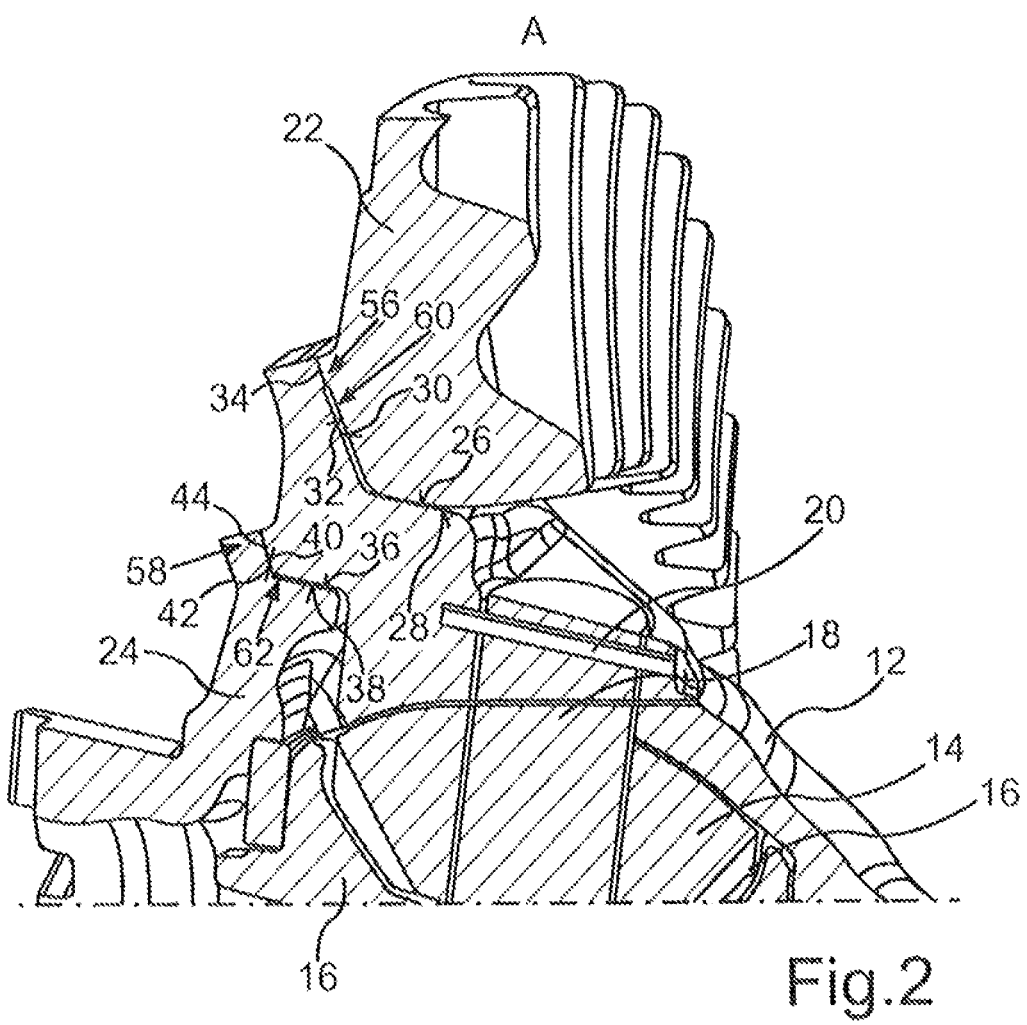
Figure 3:
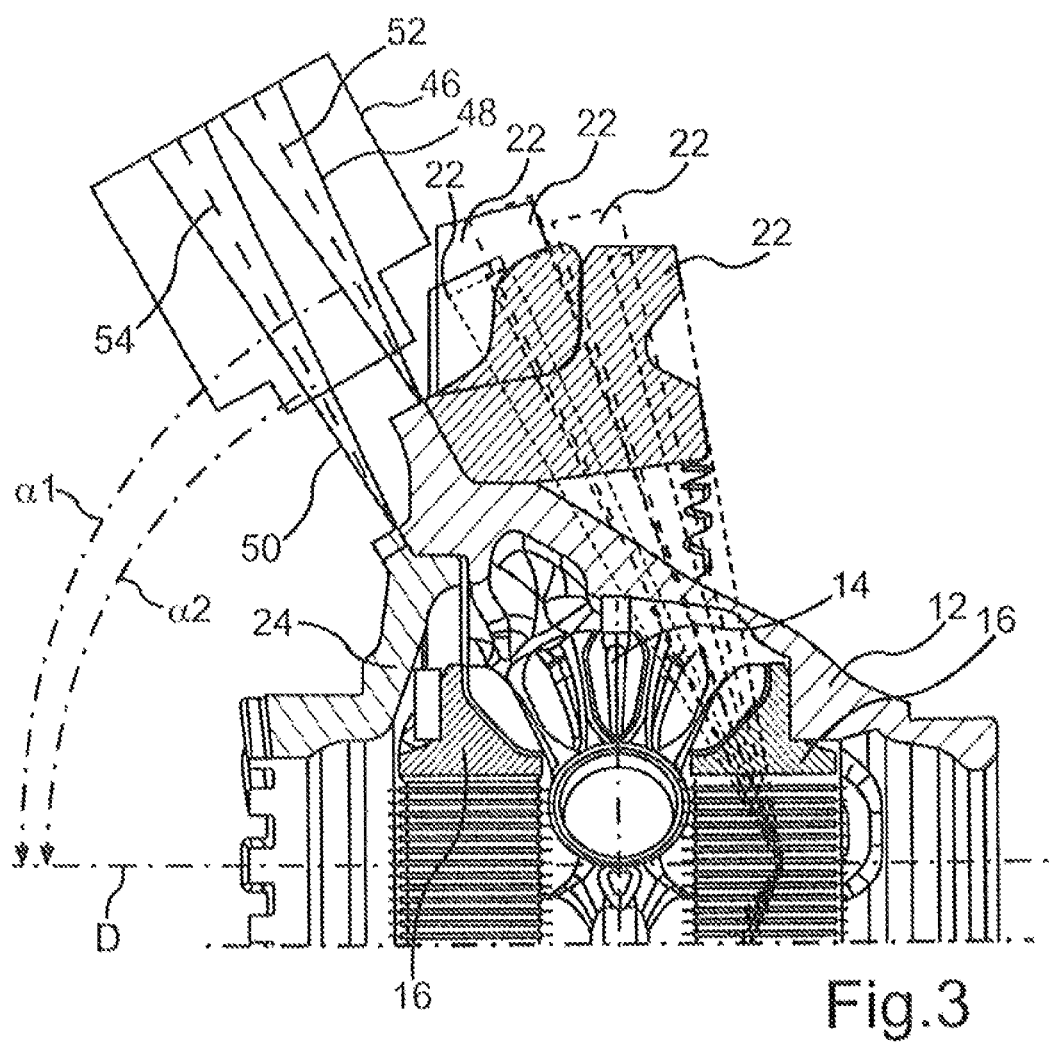

In the drawing is shown:

FIG. 1 in sections, a schematic longitudinal section view of a differential gear for a motor vehicle;

FIG. 2 in sections, a further schematic longitudinal section view of the differential gear according to FIG. 1 in a region A identified in FIG. 1, and FIG. 3 in sections, a schematic longitudinal section view of various embodiments of the differential gear according to FIGS. 1 and 2 for the representation of a modular system for the cost-efficient production of the different embodiments of the differential gear.

DETAILED DESCRIPTION

FIGS. 1 and 2 show a differential gear 10 for a motor vehicle. The differential gear 10 comprises a first housing part 12 as a first gear part, which is referred to as a differential gear housing and serves for the reception of compensation gears 14, 16 formed presently as bevel gears. The compensation gears 16 can be connected non-rotatably to drive shafts of the motor vehicle, such that the drive shafts and wheels of the motor vehicle driven by these are driven.

The compensation gears 14, 16 are, for example, formed as warm-forged components and are held via a respective bolt 18 on the first housing part 12. The respective bolt 18 is set by means of a pin 20 on the first housing part 12. This means that the bolt 18 is not able to move relative to the first housing part 12, while the respective corresponding compensation gear 14 can rotate around this relative to the bolt 18.

The differential gear 10 comprises a crown wheel 22 as a second gear part, which is connected non-rotatably to the first housing part 12. Torques can be initiated in the differential gear 10 via the crown wheel 22, such that the crown wheel 22, and with this the first housing part 12, is rotated around a mutual rotational axis.

The differential gear 10 comprises a further housing part 24 as a third gear part, which is also referred to as a differential lock cover. The further housing part 24 serves for the assembly and, if necessary, for the fixing of a differential lock. If such a differential lock is not provided, then the first housing part 12 and the further housing part 24 can also be formed as one piece with each other.

For the connection of the crown wheel 22 to the first housing part 12, respective first connection surfaces 26, 28 running in the axial direction are provided, via which the crown wheel 22 and the first housing part 12 are connected to each other by means of a first press fit. Furthermore, respective second connection surfaces 30, 32 running at an angle to the axial direction of the differential gear 10 are provided, via which the crown wheel 22 and the first housing part 12 are connected to each other, forming a first welding seam 34, i.e. are welded to one another. The axial direction coincides with the rotational axis of the differential gear 10. The crown wheel 22 is formed from a steel, in particular from an annealed steel. The steel is a high-value material, such that the crown wheel 22 can also bear high loads, in particular as a result of the introduction of torques, fundamentally without damage.

The first housing part 12 is formed from a grey cast iron. In comparison to the crown wheel 22, only low loads affect the first housing part 12 during the operation of the differential 10, such that the first housing part 12 can be formed from the more cost-efficient grey cast iron.

For the connection of the first housing part 12 to the further housing part 24, respective third connection surfaces 36, 38 running in the axial direction are provided, via which the first housing part 12 and the further housing part 24 are connected to each other by means of a further press fit. Furthermore, respective fourth connection surfaces 40, 42 running at an angle to the axial direction are provided, via which the first housing part 12 and the further housing part 24 are connected to each other, forming a further welding seam 44, i.e. are welded to one another.

The further housing part 24 is formed from a relatively high-value material, if the differential lock is provided. Otherwise, the further housing part 24 is formed from a cost-efficient material, in particular if the further housing part 24 and the first housing part 12 are formed as one piece with each other.

As can be recognized when seen together with FIG. 3, the gear parts are to be welded to one another in a cost-efficient manner by means of a laser welding method due to the angled arrangement of the second connection surfaces 30, 32 and the fourth connection surfaces 40, 42, as, due to the angled arrangement, a particularly advantageous accessibility of welding optics 46 to the connection surfaces 30, 32 or 40, 42 is created. In other words, the welding optics 46 can be relatively easily guided during the welding of the gear parts, without colliding with the gear parts and in particular with the crown wheel 22.

The welding seams 34, 44, are thus adapted with regard to their respective geometries and the loads that affect them, as they are, on the one hand, able to be produced in a time and cost-efficient manner and, on the other hand, are at least fundamentally subjected to pressure loads, in particular due to the additional connection of the gear parts, via the respective press fit, during the operation of the differential gear 10. A load under tension is avoided or at least kept very low, which is an advantage for the robustness and the certainty of fulfilling the function of the differential gear 10.

In FIG. 3, respective laser beam cones 48, 50 are shown, by means of which the crown wheel 22 and the first housing part 12 or the first housing part 12 and the further housing part 24 are welded to one another.

In FIG. 3, respective center lines 52, 54 of the laser beam cones 48, 50 are also shown. Here, the center line 52 of the laser beam cone 48 coincides with the second connection surfaces 30, 32. Therein, the center line 52 encloses the rotational axis of the differential gear 10 denoted in FIG. 3 with D, and thus an angle $\alpha_1$ of at least fundamentally 60° with the axial direction. This means that the second connection surfaces 30, 32 enclose the rotational axis D and thus an angle of at least fundamentally 60° with the axial direction.

The center line 54 encloses the rotational axis D and thus an angle $\alpha_2$ of at least fundamentally 60° with the axial direction. This means that the fourth connection surfaces 40, 42 also enclose the rotational axis D and thus an angle of at least fundamentally 60° with the axial direction.

The welding seams 34, 44 which are formed as laser welding seams, are therein produced particularly cheaply as from German patent document DE 10 2008 027 167 A1. In the method presented there for the welding of two parts, here the individual gear parts 12, 22, 24, which consist of steel and cast iron materials, a specific structure is targetedly introduced into the welding seam. By using this method, the use of a welding filler material can be dispensed with, which considerably reduces the production costs and the effort needed for the laser welding.

Alternatively, it can be provided that, when welding the gear parts 12, 22, 24, a welding filler material with a nickel proportion is used. Thus, in particular, a particularly cheap metallurgic connection can be implemented between the gear parts.

As will be appreciated in particular from FIG. 2, a respective welding penetration depth of the welding seams 34, 44 does not extend over the complete connection surfaces 30, 32 or 40, 42. Rather, the welding seams 34, 44 only extend in a respective partial region 56, 58 of the connection surfaces 30, 32 or 40, 42. Thus a respective air gap 60, 62 is provided in the radial direction underneath the respective welding seam 34, 44. Alternatively it is possible that the crown wheel 22 and the first housing part 12 or the first housing part 12 and the further housing part 24 fit against one another in the radial direction underneath the respective welding seam 34, 44, but are not welded to one another.

As is furthermore to be appreciated from FIG. 2, the second connection surfaces 30, 32 connect directly to the first connection surfaces 26, 28. Likewise, the fourth connection surfaces 40, 42 connect directly to the third connection surfaces 36, 38. In other words, the first connection surfaces 26, 28 are not at a distance from the second connection surfaces 30, 32, but rather merge into these. The same applies for the third connection surfaces 36, 38 and the corresponding fourth connection surfaces 40, 42. This keeps the material requirement for the production of the differential gear 10 and thus its production costs as well as its construction space requirement particularly low.

The time and cost-efficient producibility of the differential gear 10 also enables the simple and cost-efficient representation of a modular system, which comprises a plurality of crown wheels 22 that differ from one another, a plurality of first housing parts 12 that differ from one another, as well as a plurality of further housing parts 24 that differ from one another.

The several first housing parts 12 differ, for example, with regard to the number of bolts 18 that are able to be received and thus with regard to the number of compensation gears 14 that are able to be received. For example, three variants of the first housing part 12 that differ from one another are provided, wherein a first variant enables the receiving of two bolts 18, a second variant the receiving of three bolts 18 and the third variant the receiving of four bolts 18. Therein the bolts 18 are referred to as pins.

The crown wheels 22 differ, for example, with regard to their diameter and/or the number of teeth. In FIG. 3, different variants of the crown wheel 22 are shown, which can also differ from one another with regard to their respective gear ratio. For example, in the modular system at least twenty different variants of the crown wheel 22 are provided.

The different variants of the first housing part 12 and of the crown wheel 22 differ, for example, alternatively or additionally with regard to their respective pilot diameter, which refer to the connection surfaces 26, 28.

Two variants that different from one another, for example, are provided in the modular system by the further housing part 24. A first of the variants is, for example, provided for the use of the differential lock and enables the determination of the differential lock. The second variant is then used if the differential lock is not provided.

The different variants of the first housing part 12, of the crown wheel 22 and of the further housing part 24 are now able to be combined with one another in a simple manner and connected to one another via the respective connection surfaces 26, 28, 30, 32, 36, 38, 40, 42, such that a plurality of different differential gears 10 can be produced in a simple, time and cost-efficient manner, wherein the different variants of the differential gear 10 are adapted to different requirements and purposes, for example to use in a road vehicle, in a construction vehicle or similar.

The differential gear 10 also has the advantage of an only very low construction space requirement as well as a low weight in comparison to a connection of the gear parts by means of screw connections, as additional connection means, such as, for example screws as well as screw connections for the screws, are not provided and not necessary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A differential gear for a motor vehicle, the differential gear comprising:
   at least one housing part, which is a first gear part; and
   a crown wheel, which is a second gear part,
   wherein the first and second gear parts are connected to one another via respective first connection surfaces running in an axial direction, by a press fit, and via respective second connection surfaces running at an angle to the axial direction, forming a welding seam, wherein the second connection surfaces enclose an angle with the axial direction in a range of 25 degrees to 65 degrees,
   wherein one of the first and second gear parts is formed from steel and the other of the first and second gear parts is formed from a cast iron material.

2. The differential gear of claim 1, wherein the cast iron material is a grey cast iron.

3. The differential gear of claim 1, wherein the crown wheel is formed from a case-hardening steel, and the housing part is formed from the cast iron material.

4. The differential gear of claim 1, wherein the second connection surfaces connect directly to the first connection surfaces.

5. A differential gear for a motor vehicle, the differential gear comprising:
   at least one housing part, which is a first gear part; and
   a crown wheel, which is a second gear part,
   wherein the first and second gear parts are connected to each other via respective first connection surfaces running in an axial direction, by a press fit, and via respective second connection surfaces running at an angle to the axial direction, forming a welding seam, wherein the second connection surfaces enclose an angle with the axial direction in a range of 25 degrees to 65 degrees,
   wherein the second connection surfaces are connected directly to the first connection surfaces.

6. The differential gear of claim 5, further comprising:
   at least one further housing part, which is a third gear part,
   wherein the third gear part is connected to the first gear part via respective third connection surfaces running in the axial direction, by a further press fit, and via respective fourth connection surfaces running at an angle to the axial direction, forming a further welding seam.

7. The differential gear of claim 6, wherein the third gear part is formed from a steel.

8. The differential gear of claim 6, wherein the fourth connection surfaces are connected directly to the third connection surfaces.

9. The differential gear of claim 6, wherein the fourth connection surfaces enclose an angle with the axial direction in a range of 25 degrees to 65 degrees.

* * * * *